(12) United States Patent
dos Santos Silva et al.

(10) Patent No.: US 11,044,155 B2
(45) Date of Patent: Jun. 22, 2021

(54) UTILIZING UNSTRUCTURED DATA IN SELF-ORGANIZED NETWORKS

(71) Applicant: INTERNATIONAL BUSINESS MACHINES CORPORATION, Armonk, NY (US)

(72) Inventors: Bruno dos Santos Silva, McKinney, TX (US); Diogo Tadeu Silva de Araujo, Cedar Park, TX (US)

(73) Assignee: International Business Machines Corporation, Armonk, NY (US)

( * ) Notice: Subject to any disclaimer, the term of this patent is extended or adjusted under 35 U.S.C. 154(b) by 141 days.

(21) Appl. No.: 16/527,204

(22) Filed: Jul. 31, 2019

(65) Prior Publication Data
US 2021/0036921 A1 Feb. 4, 2021

(51) Int. Cl.
| | | |
|---|---|---|
| *H04W 24/02* | (2009.01) | |
| *H04L 12/24* | (2006.01) | |
| *G06F 16/2458* | (2019.01) | |
| *G06N 3/08* | (2006.01) | |
| *G06N 3/04* | (2006.01) | |
| *H04W 84/18* | (2009.01) | |

(52) U.S. Cl.
CPC ...... *H04L 41/0823* (2013.01); *G06F 16/2465* (2019.01); *G06N 3/0445* (2013.01); *G06N 3/08* (2013.01); *H04L 41/16* (2013.01); *G06F 2216/03* (2013.01); *H04W 84/18* (2013.01)

(58) Field of Classification Search
CPC ............................... H04W 24/02; H04W 72/04
See application file for complete search history.

(56) References Cited

U.S. PATENT DOCUMENTS

| | | | |
|---|---|---|---|
| 8,559,388 B2 | 10/2013 | Viorel et al. | |
| 8,665,835 B2 | 3/2014 | Hussein et al. | |
| 9,301,205 B2 | 3/2016 | Ghai et al. | |
| 9,832,674 B2 | 11/2017 | Ghai | |
| 9,918,239 B2 | 3/2018 | Thomas et al. | |
| 10,045,306 B2 | 8/2018 | Tarlazzi et al. | |
| 10,219,261 B2 | 2/2019 | Mahimkar et al. | |
| 10,756,970 B1 * | 8/2020 | Hermoni | H04L 41/0816 |

(Continued)

FOREIGN PATENT DOCUMENTS

| | | |
|---|---|---|
| WO | 2010140053 A1 | 12/2010 |
| WO | 2019034805 A1 | 2/2019 |

OTHER PUBLICATIONS

Mell et al., "The NIST Definition of Cloud Computing", Recommendations of the National Institute of Standards and Technology, NIST Special Publication 800-145, Sep. 2011, 7 pages.

(Continued)

*Primary Examiner* — Zhiren Qin
(74) *Attorney, Agent, or Firm* — Alexis N. Hatzis

(57) ABSTRACT

A method, computer system, and a computer program product for optimizing user experience by utilizing at least one self-organizing network (SON) is provided. The present invention may include generating one or more predictions associated with one or more optimizations for a plurality of unstructured data associated with one or more combined data sets. The present invention may then include transferring the generated one or more predictions associated with the one or more optimizations to at least one SON controller. The present invention may further include implementing the one or more optimizations to an antennae signal to determine a relationship with the implemented one or more optimizations and the plurality of unstructured data.

20 Claims, 7 Drawing Sheets

(56) References Cited

U.S. PATENT DOCUMENTS

| | | | |
|---|---|---|---|
| 2003/0021251 | A1 | 1/2003 | Moshiri-Tafreshi et al. |
| 2016/0164732 | A1* | 6/2016 | Suerbaum ............ H04L 41/0886 370/328 |
| 2016/0212634 | A1* | 7/2016 | Flanagan ............. H04W 64/003 |
| 2019/0159048 | A1* | 5/2019 | Feldkamp ............. H04W 24/08 |
| 2019/0230122 | A1* | 7/2019 | Chin ..................... H04L 43/028 |
| 2020/0015101 | A1* | 1/2020 | Kucera ................. H04W 52/54 |
| 2020/0186473 | A1* | 6/2020 | Serrano Garcia ..... H04L 47/127 |
| 2020/0314826 | A1* | 10/2020 | Sharma ................. H04W 24/02 |
| 2020/0348662 | A1* | 11/2020 | Cella .................... G05B 23/024 |
| 2020/0372562 | A1* | 11/2020 | Sanghavi ........... G06Q 30/0251 |

OTHER PUBLICATIONS

Twitter Developers, "API reference index", printed on May 6, 2019, 9 pages, https://developer.twitter.com/en/docs/api-reference-index.html.

Ericsson, "Key Performance Indicators", Jun. 23, 2015, 75 pages, https://pt.slideshare.net/kyungu_c/key-performance-indicator-70874495.

Kreher et al., "Key Performance Indicators and Measurements for LTE Radio Network Optimization", LTE Signaling, Troubleshooting and Optimization, First Edition, 2011, 89 pages.

Osterbo et al., "Benefits of Self-Organizing Networks (SON) for Mobile Operators", Journal of Computer Networks and Communications, vol. 2012, Article ID 862527, 16 pages.

Wikipedia, "Pearson correlation coefficient", printed on May 6, 2019, 18 pages.

Wikipedia, "Predictive analytics", printed on May 6, 2019, 17 pages.

Colah, "Understanding LSTM Networks", GITHUB, Aug. 27, 2015, 7 pages.

* cited by examiner

UTILIZING UNSTRUCTURED DATA IN SELF-ORGANIZED NETWORKS

BACKGROUND

The present invention relates generally to the field of computing, and more particularly to network management automation.

In the past, a prevalent problem, in wireless and mobile technology, may have been hardware capacity and coverage, and, over time, those issues were solved by modern and more scalable hardware. Additionally, as Internet of Things (IoT) and cloud adaption grew, a demand for quick expansion may have further shifted and complicated the technological limitations from the past. As users increase access into mobile technology and into more powerful hardware, the demand for more capacity and/or coverage may have evolved into a vendor issue to retain customers based on service quality.

Self-organizing networks (SON) may be defined as a set of use cases covering various aspects of network operations from network planning to maintenance activities in which the network may self-organize and manage resources to optimize network quality and performance is achieved.

SUMMARY

Embodiments of the present invention disclose a method, computer system, and a computer program product for optimizing user experience by utilizing at least one self-organizing network (SON). The present invention may include generating one or more predictions associated with one or more optimizations for a plurality of unstructured data associated with one or more combined data sets. The present invention may then include transferring the generated one or more predictions associated with the one or more optimizations to at least one SON controller. The present invention may further include implementing the one or more optimizations to an antennae signal to determine a relationship with the implemented one or more optimizations and the plurality of unstructured data.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
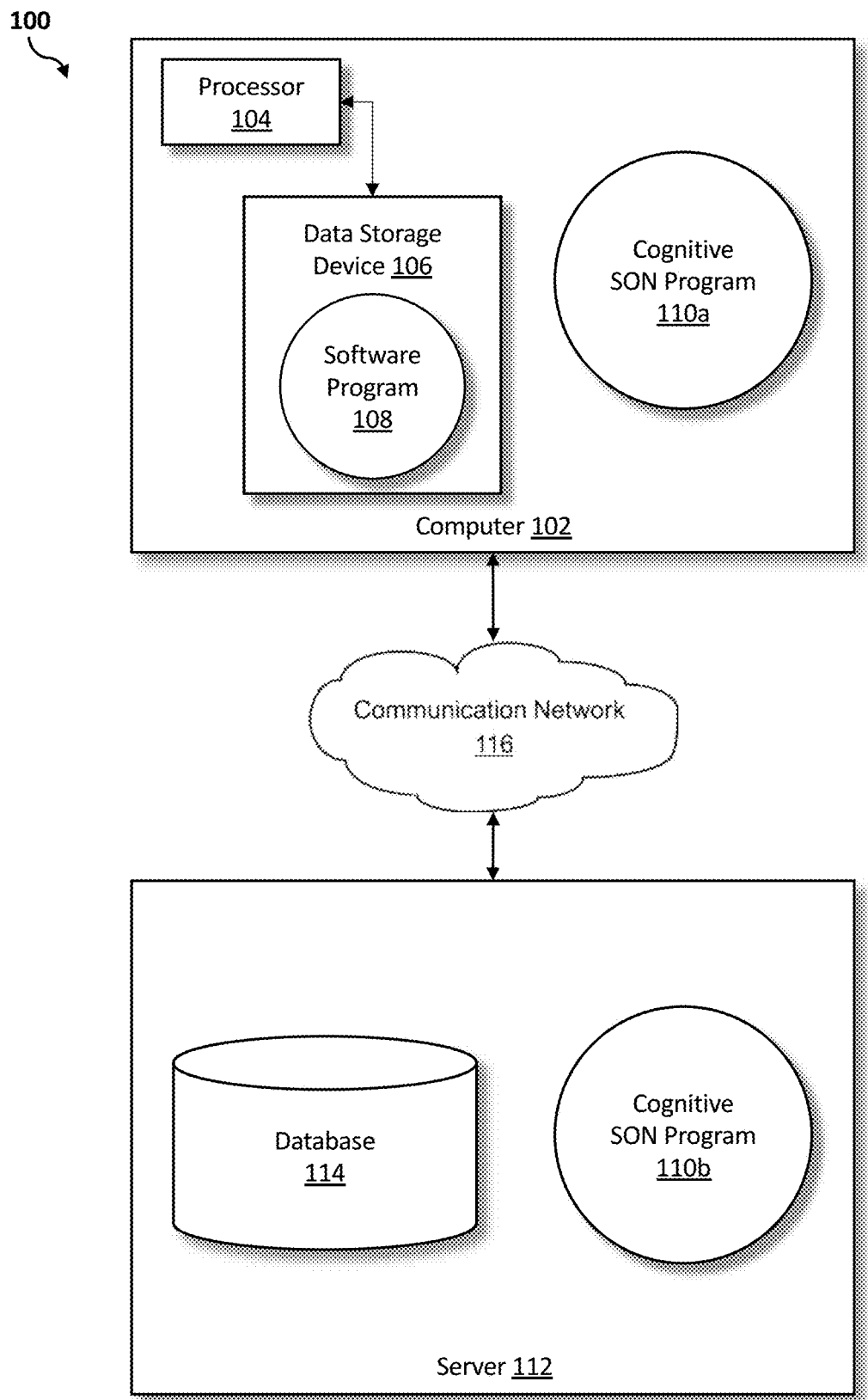
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language, Python programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product for optimizing user experience by utilizing at least one self-organizing network (SON). As such, the present embodiment has the capacity to improve the technical field of network management automation by utilizing a predictive analytics approach to pro-actively determine the effect that data may have on the experience of a user. More specifically, the cognitive self-organizing network (SON) program may collect unstructured data associated with the mobile devices and social media and/or emails. The cognitive SON program may then fuse, structure and correlate the collected data. Then, the cognitive SON program may generate a prediction, which is sent to at least one SON controller. The optimization may then be implemented on the antennae, and the cognitive SON program may pro-actively determine whether the optimization from the generated prediction should be discarded or processed based on the impact that the optimization has on the experience for that user.

As previously described, many vendors have created technologies, such as wireless and mobile technology, that shifted, not solve, technological issues or problems from one area of technology to another. In the past, a prevalent problem, in wireless and mobile technology, may have been hardware capacity and coverage, and, over time, those issues were solved by modern and more scalable hardware. Similarly, as Internet of Things (IoT) and cloud adaption grew, a demand for quick expansion may have further shifted and complicated the technological limitations from the past. As users increase access into mobile technology and into more powerful hardware, the demand for more capacity and/or coverage may have evolved into a vendor issue to retain customers based on service quality.

As such, self-organizing networks (SON) may have been created, providing different approaches into solving this problem. Self-organizing networks (SON) may be defined as a set of use cases covering various aspects of network operations from network planning to maintenance activities in which the network may self-organize and manage resources to optimize network quality and performance is achieved. As data is collected from users and their mobile devices, key performance indicators (KPIs) may be generated from the user experience, helping to understand how the devices are being utilized, as well as understand how social events give more context around a poor user experience related to other factors and may be more precise and even more proactive based on the data. That information may be provided to suggest optimization points in a span of 24 hours, which may be too late in some instances. Unfortunately, these metrics and KPIs may be based on the exclusivity of static data, such as user signal strength, download rate, upload rate and call quality, and fail to take into account unstructured data factors that may play a key role into the overall picture of that specific cell that the user is connected to.

Therefore, it may be advantageous to, among other things, bring unstructured data into one or more self-organizing networks (SONs) that will contextualize the decision mechanism and may be fed into a recurrent neural network (RNN) to learn from key factors that may have played a role into a problematic cell in the past. The cognitive SON program may further help to prevent a problem (i.e., stopping or eliminating a problem before the problem occurs) based on previous data indicators, and may also to be more precise into which parameter(s) of the antenna (or antennae) may be changed to optimize the user experience.

According to at least one embodiment, the cognitive SON program may include one or more self-organizing network (SON) controllers that may capture metrics (i.e., multiple variables) and make suggestions (i.e., predictions) for optimization based on the collected data. The present embodiment may further include an air interface monitoring system for the cognitive SON program to capture the user data through an air interface of a mobile system. To capture the data from the air interface, the SON program may utilize common public radio interface (CPRI) (digital), debug port (digital), and/or radio frequency (RF) antenna (analog).

According to at least one embodiment, the cognitive SON program may utilize a predictive analytics approach to generate predictions for optimizing the user experience. The stages of the predictive analytics approach include project definition, data collection, data analysis, statistics, modelling, deployment of a model, and model monitoring.

According to at least one embodiment, the cognitive SON program may include a data parser, which is an external software program that may be implemented as a serverless program in the cloud, to pull data from social media streams (e.g., an application programming interface (API) to push the data into a data mining model). The present embodiment may further include a data mining model, which may search through the data downloaded and may extract information, such as events in the area (e.g. shows, games) that may compromise the infrastructure capacity and global positioning system (GPS) data from the location of the user (i.e., user location).

According to at least one embodiment, the cognitive SON program may include a cloud-based accumulator (e.g., object storage and recurrent neural network (RNN)) in which an infrastructure in the cloud may accumulate the data collected and running the data against a neural network model to accumulate the data and learn from previous sets of data (e.g., historical data from previously created, combined and/or collected data sets).

According to at least one embodiment, the cognitive SON program may include collecting data (e.g., unstructured data) from different data points (e.g., mobile, antennae, social media feeds, SON key performance indicators (KPIs)). The collected data may then be fused and structured, and correlated into multiple parameters (i.e., multiple variables or metrics). The cognitive SON program may then generate at least one prediction to optimize the user experience based on the multiple parameters from the collected and structured data by utilizing machine learning. The present embodiment may further include sending the generated predictions to one or more SON controllers, and then pro-actively collecting more data to the further understand the impact of the changes (i.e., optimizations).

According to at least one embodiment, the cognitive SON program may be applied in a single scale of a single SON controller, or multiple SON controllers, causing the cognitive SON program to be a distributed system. As a distributed system, the cognitive SON program may predict the amount of load an antennae may have in a given population change for a particular area.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a cognitive SON program 110*a*. The networked computer environment 100 may also include a server 112 that is enabled to run a cognitive SON program 110*b* that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 5, server computer 112 may include internal components 902*a* and external components 904*a*, respectively, and client computer 102 may include internal components 902*b* and external components 904*b*, respectively. Server computer 112 may also operate in a cloud computing service model, such as Software as a Service (SaaS), Analytics as a Service (AaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the cognitive SON program 110*a*, 110*b* may interact with a database 114 that may be embedded in various storage devices, such as, but not limited to a computer/mobile device 102, a networked server 112, or a cloud storage service.

According to the present embodiment, a user using a client computer 102 or a server computer 112 may use the cognitive SON program 110*a*, 110*b* (respectively) to proactively determine the impact of optimization to the experience of a user. The cognitive SON method is explained in more detail below with respect to FIGS. 2 to 4.

Figure 2:
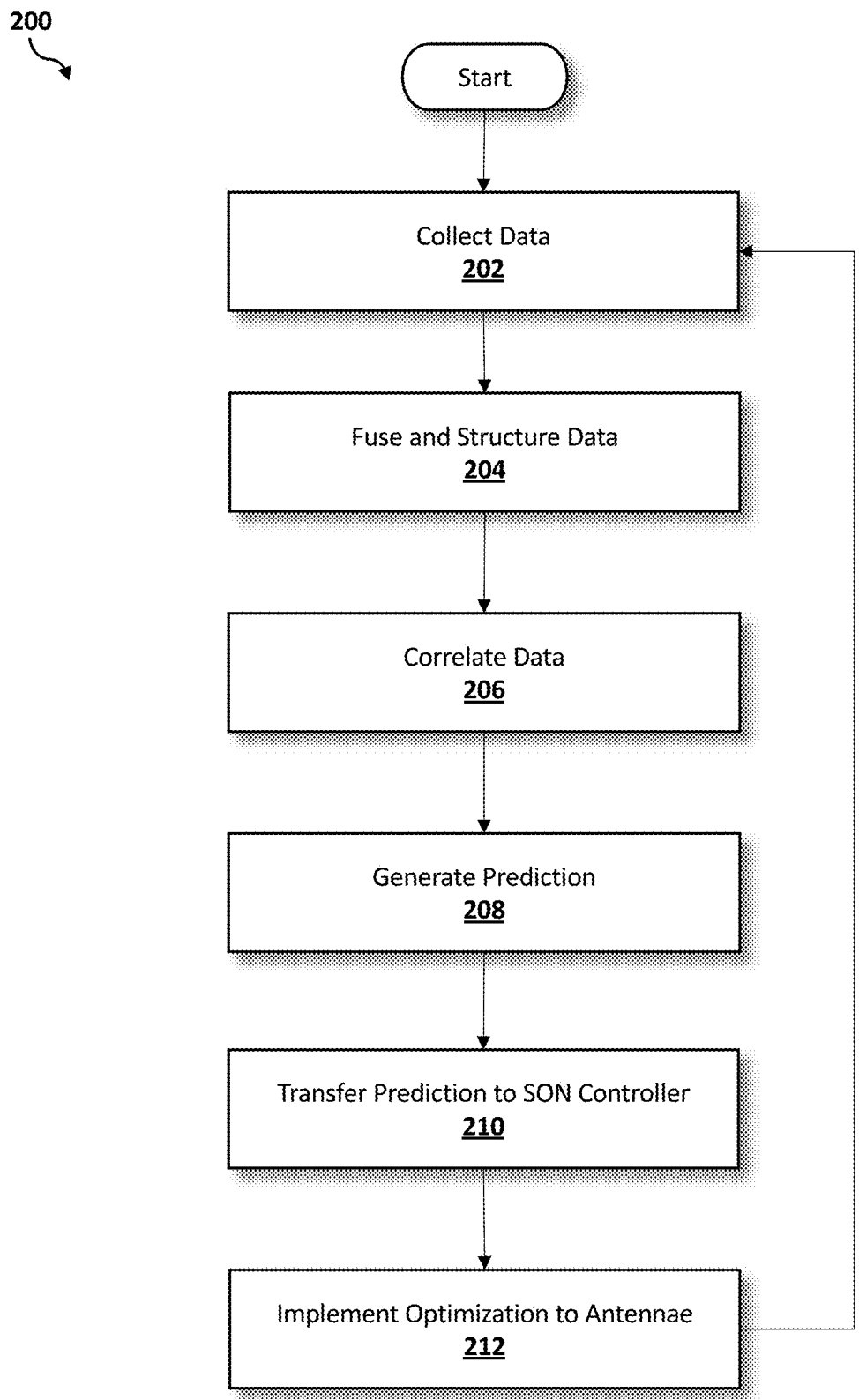
FIG. 2 is an operational flowchart illustrating a process for cognitive self-organizing networks (SON) according to at least one embodiment.

Referring now to FIG. 2, an operational flowchart illustrating the exemplary cognitive SON process 200 used by the cognitive SON program 110*a*, 110*b* according to at least one embodiment is depicted.

At 202, data is collected. Data (e.g., unstructured data) may be retrieved or collected automatically, manually with input from a user via a graphical user interface (GUI), or an application downloaded onto a user device (user's computer 102). Utilizing a software program 108 on the user device, data may be collected as input into the cognitive SON program 110a, 110b via the communication network 116. Alternatively, the data may be collected via an air interface monitoring system associated with the user device (e.g., mobile device). The data collected may include mobile data and social media data.

Mobile data may generate different data parameters (i.e., key performance indicators (KPIs)) based on the mobile device (user device) associated with the user. The mobile data may include, for example, the user international mobile equipment identity (User IMEI(id)), mobile position in the antennae (mobile position), user download rates (DL rate) in megabytes per second (mb/s), user upload rates (UL rates) in megabytes per second (mb/s), number of connections, and quality of service (QoS) profile. The mobile data collected may be utilized to generate KPIs to understand human context and/or user experience for a particular period of time.

The mobile data collected may be stored in a data structure for use by the cognitive SON program 110a, 110b.

In at least one embodiment, the cognitive SON program 110a, 110b may compile the mobile data, as a first data set, in addition to any other forms of data generated by the cognitive SON program 110a, 110b, into a table, chart, or a graphical representation for the user to access as needed. In other embodiments, the cognitive SON program 110a, 110b may present the mobile data to a user in the form of a table, chart or graphical representation. As such, each mobile device may compile or provide the mobile data collected in various demonstrative methods that may represent the antennae position. The following Table 1 represents an example of the mobile data collected and compiled into a first data set:

TABLE 1

| User IMEI | Mobile Position | DL Rate | UL Rate | Number of Connections | QoS Profile |
|---|---|---|---|---|---|
| 0001 | antennae 0.1.1 | 1000 mb/s | 50 mb/s | 2 | Class 1 |
| 0005 | antennae 1.3.5 | 30 mb/s | 5 mb/s | 2 | Class 3 |
| 0010 | antennae 0.0.0 | 2000 mb/s | 500 mb/s | 2 | Class 4 |
| 0015 | antennae 0.0.1 | 1500 mb/s | 250 mb/s | 2 | Class 5 |

Table 1 may demonstrate the type of data utilized from a correlation perspective to accomplish the results in this context.

Additionally, the mobile data collected into the first data set may be cross-referenced with social media data from social media feeds, e-mail and public sources (i.e., second data set), to further understand the effect of environment on human context and/or user experience. The social media data may increase precision and accuracy into a changing parameters for a given user. In one embodiment, social media data may be collected through a serverless infrastructure in the cloud based on the user IMEI by the service provider or may be appended in a data collection model, where the cognitive SON program 110a, 110b may provide access to data collection to the service provider through the mobile device. In some embodiments, social media data may be collected, via a social media application programming interface (API) (e.g., Twitter® (Twitter and all Twitter-based trademarks and logos are trademarks or registered trademarks of Twitter, Inc. and/or its affiliates)). In another embodiment, social media data may be collected from a data parser, which may pull such data from one or more social media streams, and further push the social media data into a data mining model.

In the present embodiment, the cognitive SON program 110a, 110b may utilize the data mining model to parse through the collected data and extract information, such as events and global positioning system (GPS) data. In some embodiments, the social media APIs may collect data associated with the geo-location of the users and event tags to correlate that social media data with the mobile position of the user, the API endpoints may, for example, include:

GEO
Get Information about a Place
    GET geo/id/:place_id
Get Places Near a Location
    GET geo/reverse_geocode
    GET geo/search
Measurement
    App Event Provider Configurations
    App Event Tags
    App Lists
    Conversion Attribution
    Conversion Event
    Web Event Tags In at least one embodiment, additional social media data may be collected from multiple endpoints associated with multiple APIs. The cognitive SON program 110a, 110b may utilize multiple APIs to mine the data (i.e., data mining) depending on the type of data to be utilized, and search for data associated with the user to include in the social media data collected. For example, for a given User IMEI, where the tag is #internationalartshow, the social media API may determine the geo-location of the user through the event tag #internationalartshow.

In the present embodiment, the method for connecting to the social media API and collecting data may be conducted in any programming language.

Additionally, the SONs may maintain a database (i.e., database 114) of antennae parameters and E-UTRAN Node B (Evolved Node B or eNodeB) data that may be utilized to change the data values thereby changing the KPIs to a better user experience. Therefore, the cognitive SON program 110a, 110b may change the antennae signal range to improve user coverage (e.g., reducing interference).

For example, the cognitive SON program 110a, 110b utilizes air interface on User A's mobile phone to capture mobile data associated with User A thereby collecting mobile data into the first data set (Data Set M) as demonstrated in the following Table 2:

TABLE 2

| User IMEI (Axis 1) | Mobile Position (Axis 2) | DL Rate (Axis 3) | UL Rate (Axis 4) | Number of Connections (Axis 5) | QoS Profile (Axis 6) |
|---|---|---|---|---|---|
| 0001 | antennae 0.1.1 | 5000 mb/s | 80 mb/s | 2 | Class 1 |
| 0002 | antennae 1.3.5 | 14000 mb/s | 122 mb/s | 3 | Class 2 |
| 0005 | antennae 0.0.0 | 8500 mb/s | 28 mb/s | 4 | Class 3 |

TABLE 2-continued

| User IMEI (Axis 1) | Mobile Position (Axis 2) | DL Rate (Axis 3) | UL Rate (Axis 4) | Number of Connections (Axis 5) | QoS Profile (Axis 6) |
|---|---|---|---|---|---|
| 0009 | antennae 0.0.1 | 49000 mb/s | 244 mb/s | 2 | Class 4 |
| 0012 | antennae 0.0.2 | 49000 mb/s | 370 mb/s | 2 | Class 5 |
| 0014 | antennae 0.2.1 | 59000 mb/s | 208 mb/s | 2 | Class 7 |
| 0016 | antennae 1.0.1 | 15000 mb/s | 102 mb/s | 2 | Class 8 |
| 0020 | antennae 1.2.3 | 11000 mb/s | 45 mb/s | 3 | Class 6 |

Then, the cognitive SON program 110a, 110b connects to XYZ API and collects data by utilizing Python to request library with the following simple code:
import requests
import os
import sys
import json
url='https://api.XYZ.com/1.1/geo/search.json'
headers={'Content-type', 'application/json'}
response=requests.get(url, headers=headers)
data=response.json
The XYZ API parses through multiple social media streams and posts, and emails for geo-location of the users and event tags, and collects social media data associated with User A into a second data set (Data Set S), as demonstrated in the following Table 3:

TABLE 3

| Antennae ID | Event | GPS | Antennae Signal |
|---|---|---|---|
| 1A | 1 | 0s 0n 1w 4e | 300 gHZ |
| 2B | 1 | 0s 0n 1w 4e | 400 gHZ |
| 2C | 0 | 0s 0n 2w 3e | 1300 gHZ |
| 3D | 0 | 0s 1n 2w 4e | 4500 gHZ |
| 4E | 0 | 1s 2n 1w 5e | 3300 gHZ |
| 4A | 0 | 1s 1n 1w 1e | 2000 gHZ |

TABLE 3-continued

| Antennae ID | Event | GPS | Antennae Signal |
|---|---|---|---|
| 3A | 1 | 0s 2n 1w 2e | 5500 gHZ |
| 3B | 1 | 0s 0n 1w 4e | 500 gHZ |

Next, at 204, data is fused and structured. The cognitive SON program 110a, 110b may fuse the first data set (i.e., mobile data collected) with the second data set (i.e., social media data collected) to perform data wrangling and may normalize the data associated with the both first and second data sets to provide meaningful information. The fused first and second data sets may be used to create a combined data set.

In at least one embodiment, data may be fused by appending the columns of one data set into the other data set by utilizing a data source (e.g., Python pandas library) thereby fusing one data set to the other data set using the same axis. In some embodiments, a third data set may be fused into the first and second data sets.

Additionally, the cognitive SON program 110a, 110b may utilize an external engine (e.g., security information and event management (SIEM) or a customized data-science process that works through certain libraries associated with compatible programming languages) to parse the fused data sets and clean any missing data values in the fused data sets. The external engine may then format (or structure) the data (e.g., changing values into numerical values, where 0 represents false and 1 represents true). Then, binning may be executed in which non-existing values may be estimated (e.g., value does not represent an event; however, the event is estimated based on the other data in the data set).

Continuing the previous example, the cognitive SON program 110a, 110b fuses the Data Set M and Data Set S by executing the following simple code in Python pandas library:
import os
import sys
import pandas as pd
dat1=pd.concat([datM, datS], axis=3)
The fusion of Data Sets M and S is demonstrated in the following Table 4:

TABLE 4

| User IMEI (Axis 1) | Mobile Position (Axis 2) | Antennae ID | DL Rate (Axis 3) | UL Rate (Axis 4) | Number of Connections (Axis 5) | QoS Profile (Axis 6) | Event | GPS | Antennae Signal |
|---|---|---|---|---|---|---|---|---|---|
| 0001 | antennae 0.1.1 | 1A | 5000 mb/s | 80 mb/s | 2 | Class 1 | 1 | 0s 0n 1w 4e | 300 gHZ |
| 0002 | antennae 1.3.5 | 2B | 14000 mb/s | 122 mb/s | 3 | Class 2 | 1 | 0s 0n 1w 4e | 400 gHZ |
| 0005 | antennae 0.0.0 | 2C | 8500 mb/s | 28 mb/s | 4 | Class 3 | 0 | 0s 0n 2w 3e | 1300 gHZ |
| 0009 | antennae 0.0.1 | 3D | 49000 mb/s | 244 mb/s | 2 | Class 4 | 0 | 0s 1n 2w 4e | 4500 gHZ |
| 0012 | antennae 0.0.2 | 4E | 49000 mb/s | 370 mb/s | 2 | Class 5 | 0 | 1s 2n 1w 5e | 3300 gHZ |

TABLE 4-continued

| User IMEI (Axis 1) | Mobile Position (Axis 2) | Antennae ID | DL Rate (Axis 3) | UL Rate (Axis 4) | Number of Connections (Axis 5) | QoS Profile (Axis 6) | Event | GPS | Antennae Signal |
|---|---|---|---|---|---|---|---|---|---|
| 0014 | antennae 0.2.1 | 4A | 59000 mb/s | 208 mb/s | 2 | Class 7 | 0 | 1s 1n 1w 1e | 2000 gHZ |
| 0016 | antennae 1.0.1 | 3A | 15000 mb/s | 102 mb/s | 2 | Class 8 | 1 | 0s 2n 1w 2e | 5500 gHZ |
| 0020 | antennae 1.2.3 | 3B | 11000 mb/s | 45 mb/s | 3 | Class 6 | 1 | 0s 0n 1w 4e | 500 gHZ |

The cognitive SON program 110a, 110b then structures Data Sets M and S based on axis 3, which is the download (DL) rate.

Then, at 206, the data is correlated. The cognitive SON program 110a, 110b may analyze the data in the fused data sets to determine how each factor influences each other, namely which factors change which issue in a specific antennae call, to determine a strong correlation of data (e.g., as the number of connections rise, the download and upload rates decrease in a cell). The cognitive SON program 110a, 110b may, in at least one embodiment, utilize a visual or graphical representation (e.g., linear graphs) to determine the correlation values between the factors. The graphical representation to determine the correlation of data values will be described in greater detail below with respect to FIG. 3.

In some embodiments, the cognitive SON program 110a, 110b may utilize one or more non-visual correlation statistical methods (e.g., Pearson statistics) to correlate and find a relationship between the data values. Remembering that the data values from the data sets may change based on the media collected from the points.

In the present embodiments, the more data collected may provide more insights for correlation of the data thereby causing a flexible data pipeline.

Continuing the previous example, the cognitive SON program 110a, 110b determines the correlation of the data values in fused Data Set M and Data Set S by utilizing the Pearson statistics in the following code:
pearson_coef, p_value=stats.personr[["DL Rate"], df["UL Rate"], df["Number of Connections"], df["Event"]]
Therefore, the cognitive SON program 110a, 110b determines the correlation between the occurred event, if the download and upload rates and number of connections have been affected thereby demonstrating how to correlate the values.

Then at 208, a prediction is generated. The cognitive SON program 110a, 110b may feed as input the correlated data values from the data sets into the deployment of a machine learning (ML) model (i.e., predictive ML model) in which multiple linear regression may be executed to make at least one prediction for the optimization based on the data provided. The cognitive SON program 110a, 110b may extract multiple variables (i.e., metrics) associated with the correlated data values from the combined data sets. Using training data based on historical data from antennae logs and/or multiple linear regression, cognitive SON program 110a, 110b may utilize multiple variables to perform predictive analytics to generate the prediction for the optimization based on a ML algorithm.

In at least one embodiment, the cognitive SON program 110a, 110b may feed the multiple variables from the fused and structured data sets into a recurrent neural network (RNN) model, where the data values from fused and structured data sets may be accumulated as input into the RNN model, and may output key performance indicators (KPIs) and a decision list that may be utilized to generate at least one prediction for optimizations or SON changes. The RNN may include multiple hidden layers in which the data values from the fused and structured data sets may be compared with historical data (e.g., previously collected, created and/or combined data sets, the previous successful predictions for each previously collected, created and/or combined data sets) to determine the prediction for optimization to the current data sets. In one of the hidden layers, the RNN may analyze the data from the fused and structured data sets to identify KPIs based on the historical data. Once the KPIs were identified, the RNN may proceed to the next hidden layer in which a decision list is compiled based on the historical data. The decision list may include at least one prediction for optimization of the SON based on the identified KPIs from the fused and structured data sets.

In at least one embodiment, where multiple predictions for optimizations are included in the decision list, the decision list may include a numeric score or percentage of success for the prediction based on the historical data. The cognitive SON program 110a, 110b may then select the prediction with the highest success rate or percentage of success. In some embodiments, the cognitive SON program 110a, 110b may then continue to implement each predictions for optimizations on the decision list, until no other prediction exists on the decision list. In at least one embodiment, an administrator or the user may modify or configure the settings to exclude a numeric score or percentage of success, or to change how each prediction may be implemented or selected by the cognitive SON program 110a, 110b.

Additionally, the cognitive SON program 110a, 110b may determine how the antennae may have been previously configured based on the data, and how the unstructured data plays a role in providing context into the changes made in the antennae, as well as further determine the suggested optimal value for the antennae signal and other parameters based on the parameters associated with the unstructured data, and may trigger changes in the SONs to improve user experience.

In another embodiment, the cognitive SON program 110a, 110b may utilize a SON controller may capture the metrics and generate the predictions for optimization based on the collected data. The SON controller may then be utilized to implement the generated predictions.

Continuing the previous example, when executing the multiple linear regression, the cognitive SON program 110a, 110b may first extract a number of multiple variables by executing the following code:

SON=df[['Number of connections', 'DL Rate', 'UL Rate', 'Event']].

Then, the cognitive SON program 110a, 110b may train the predictive ML model to obtain the optimal antennae signal based on the data by executing the following code:

lm.fit (SON, df['Antennae signal'])

Then, the predictive ML model outputs the following KPIs and one prediction:

KPIs: DL Rate, UL Rate, Number of Connections

YChange=lm.predict(x), which indicates that a change in the DL Rate will increase the number of connections and the UL rate.

Then, at 210, the prediction is transferred to the SON controller. Once the predictive analytics has been executed, the prediction may be transferred to one or more SON controllers via an API call through a secure tunnel (e.g., using the cloud to exchange values with on-premise boxes). Continuing the previous example, YChange=lm.predict(x), which is a change in the DL Rate will improve (increase) the number of connections and the UL rate, is transferred to the SON controller.

Then, at 212, the optimization is implemented to the antennae. The SON controller may then pro-actively, based on the predictive analytics, execute the optimization by making changes in the SONs into the antennae based on the predictive suggestion (i.e., prediction) by using various methods (e.g., self-healing method, self-optimizing method).

In at least one embodiment, different SON vendors may use different orchestration methods, which may include communication through a secure API with endpoints.

In the present embodiment, once the optimization is applied, the effectiveness may be re-measured to determine how effective the optimization has been on the antennae. The cognitive SON program 110a, 110b may be queried for the KPIs again to determine how precise the optimization were for the user by feeding the collected data into a long-short term memory (LSTM) model to determine which data may be utilized by the predictive ML model. Therefore, once an optimization or a change has been determined as effective, then the optimization may be fed into a success database (e.g., database 114) for the future use by the predictive ML model. If the optimization is determined to be ineffective, then the optimization may be discarded by the LSTM model. The LSTM model will be described in greater detail below with respect to FIG. 4.

Therefore, the predictive ML model may be more precise over time and the cognitive SON program 110a, 110b may improve the metrics through a combination of predictive analytics, historical data and unstructured data. The cognitive SON program 110a, 110b may further allow audits to the changes as the metrics occur. For a successful metric optimization, the user may receive a control message. For example, SON | V1 | PLATFORM | METRIC CHANGE=SUCCESS | KPI=IMPROVE
SON | V1 | PLATFORM | METRIC CHANGE=SUCCESS | KPI=DECREASE Continuing the previous example, the prediction, YChange=lm.predict(x), is implemented by the antennae in which any changes to the DL Rate increases the UL Rate and number of connections. The cognitive SON program 110a, 110b feeds the prediction for optimization through the LSTM model. The prediction is determined to be true by the LSTM model, and then transferred to a database (e.g., database 114). The user then receives the following control message, SON | V1 | PLATFORM | METRIC CHANGE=SUCCESS | KPI=IMPROVE, to confirm that the implemented optimization was true and successful.

In the present embodiment, the cognitive SON program 110a, 110b may utilize an auto-setting to improve the time of an analyst or user into deploying a new antennae for a particular area to improve user coverage and therefore, overall user experience.

In the present embodiment, the user may, at any time, utilize an opt-in or opt-out feature to the collection of mobile and/or social media data, including data associated with the user's emails, by the cognitive SON program 110a, 110b. In addition, the cognitive SON program 110a, 110b may indicate, to the user, when data collection has commenced. As such, the user may be aware of when data collection has commenced and/or ended.

Figure 3:
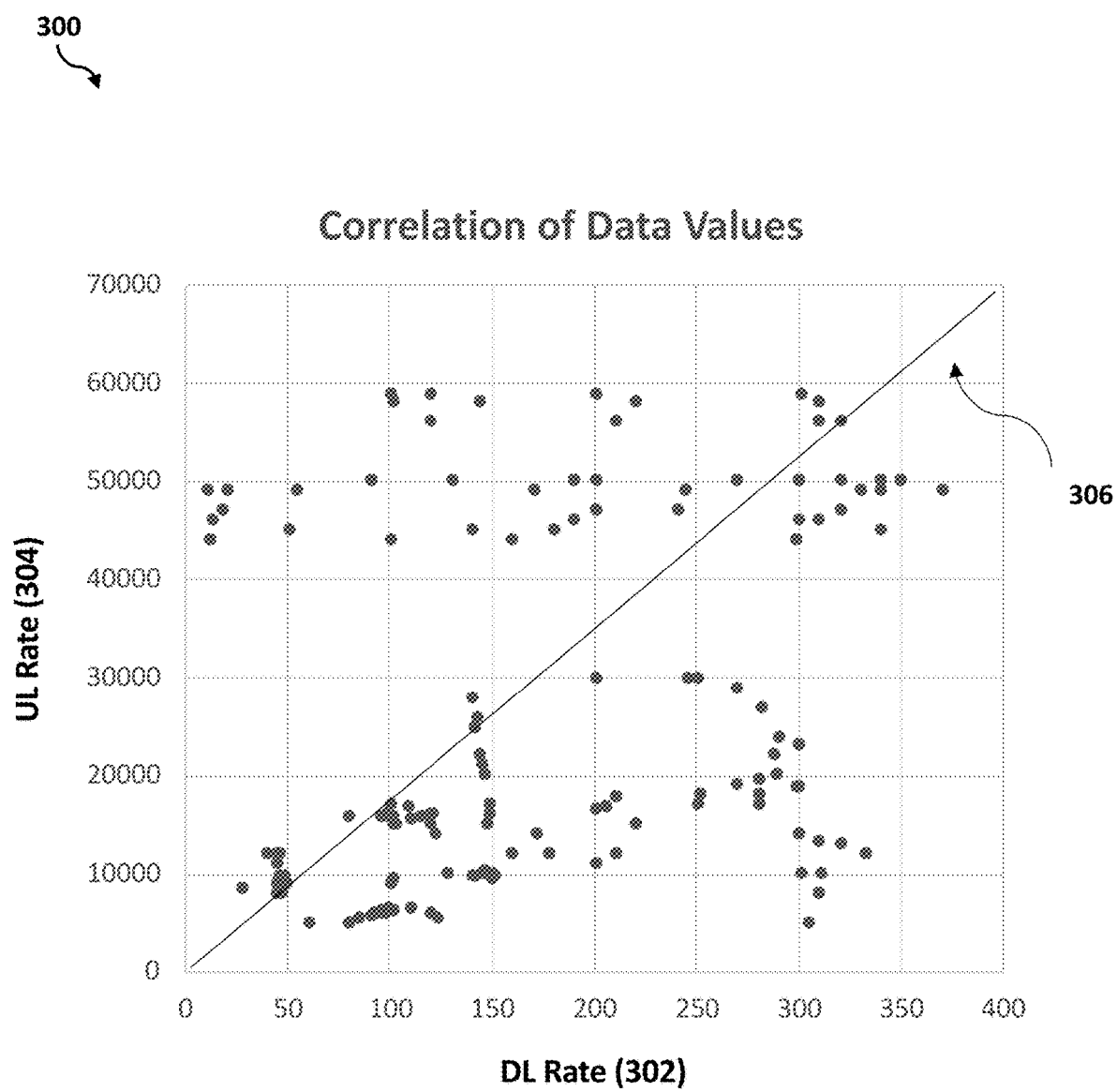
FIG. 3 is a graphical representation for determining the correlation of data values according to at least one embodiment.

FIG. 3 is a graphical representation 300 illustrating the exemplary process of determining the correlation of the data values used by the cognitive SON program 110a, 110b according to at least one embodiment is depicted.

FIG. 3 is an example of the correlation utilized by data science mechanisms. In data science, when data crawling is conducted for the data collected, the correlation between the data may be plotted to determine whether a correlation or relationship exists between the data values.

The cognitive SON program 110a, 110b may utilize DL rate 302 as the x-axis, and UL Rate 304 as the y-axis. The correlation of data values may indicate that DL rate will improve (increase) based on the UL rate. The line 306 may be utilized as a reference point to determine the relationship between the data collected and plotted with the following simple code, sns.regplot (x="DL Rate", y="UL Rate", data=df)), thereby visually observing how one data value affects the other data value. As such, the number of connections represents the number of times that DL Rate and UL Rate may be plotted on the linear graph. Therefore, as the UL rate and number of connections changes, the DL rate is affected, specifically as the DL Rate increases, the UL Rate and number of connections increases based on FIG. 3.

For example, using an automobile, data is collected on the year, manufacturer, carbon emission and engine size of the automobile. By plotting the collected data associated with the automobile, a relationship between the engine size and carbon emission may be discovered in which the larger the engine size, the greater the carbon emission.

Figure 4:
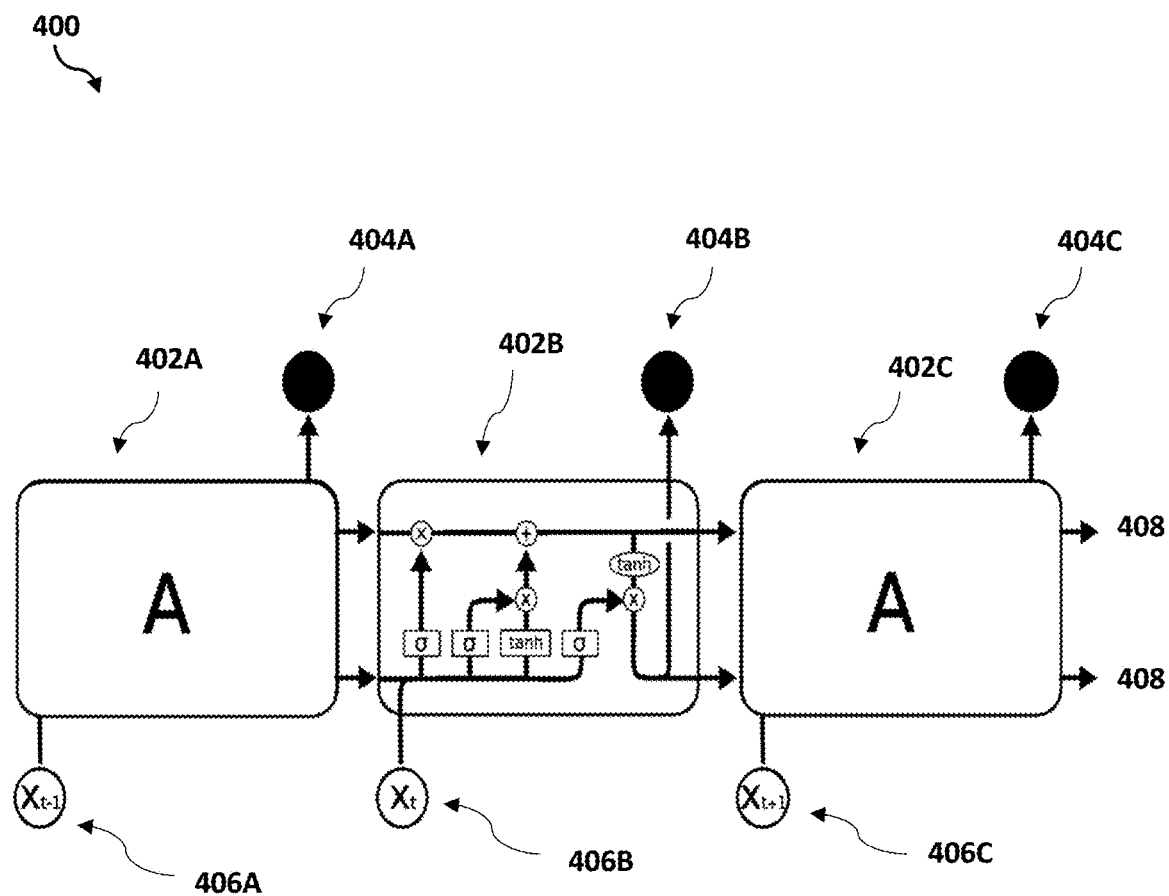
FIG. 4 is a block diagram of the long-short term memory (LSTM) model visual representation according to at least one embodiment.

FIG. 4 is a block diagram 400 of the long-short term memory (LSTM) model used by the cognitive SON program 110a, 110b according to at least one embodiment is depicted.

The LSTM model is utilized to learn the information collected by the processing layers 402A, 402B, 402C. As shown by 402B, the LSTM model may utilize a criteria to determine whether the information is true or false (e.g., based on the use of binary values). The cognitive SON program 110a, 110b may utilize the following criteria for the LSTM:

```
if KPI > first_SON_KPI:
    pass it to success table
else:
    discard
```

The information may be passed through various processing layers. For example, three processing layers as demonstrated by 402A, 402B, 402C. During each processing layer, the LSTM model determines whether the information is true or false, when the information is passed through each processing layer and deemed true, the information may be given a X+ (positive score) 406A, 406B, 406C to reinforce the data learned.

If the information is true and passed through each of the processing layers, then the information may be kept. In at least one embodiment, the information determined to be true may be transferred to a database 408 (e.g., database 114) for storage and future use. If, however, the information was determined to be false at any of the processing layers, the information may flow to the corresponding discarding layers 404A, 404B, 404C. As such, what flows to the discarded layers 404A, 404B, 404C may be discarded information and what flows to the next processing layer 402A, 402B, 402C may be a "process" information.

For example, if the KPI has an improved value in which the optimization has made improvements, then the optimization may flow to the next "process" layer and after the last processing layer 402C, the optimization is transferred to a database 408 (i.e., database 114) and kept by the predictive ML model. If, however, the performance of the KPI was worse with the optimization, then the optimization may be discarded by any of the discarding layers 404A, 404B, 404C by the LSTM model.

The functionality of a computer may be improved by the cognitive SON program 110a, 110b because the cognitive SON program 110a, 110b may feed unstructured data into self-organizing networks (SONs) and based on a predictive analytics approach of contextualizing the decision mechanism and feeding the data values into a recurrent neural network (RNN) to learn key factors based on historical data, thereby optimizing the user experience based on changes in the data values. The cognitive SON program 110a, 110b may further determine changes and/or adjustments to multiple parameters to improve antennae signal performance thereby improving the user experience.

The cognitive SON program 110a, 110b may further provide unstructured data treatment (i.e., collecting, fusing, structuring and correlating unstructured data) and storage along with more effective actions taking into consideration a larger set of data (or multiple data sets) to make an informed prediction for optimization.

It may be appreciated that FIGS. 2 to 4 provide only an illustration of one embodiment and do not imply any limitations with regard to how different embodiments may be implemented. Many modifications to the depicted embodiment(s) may be made based on design and implementation requirements.

Figure 5:
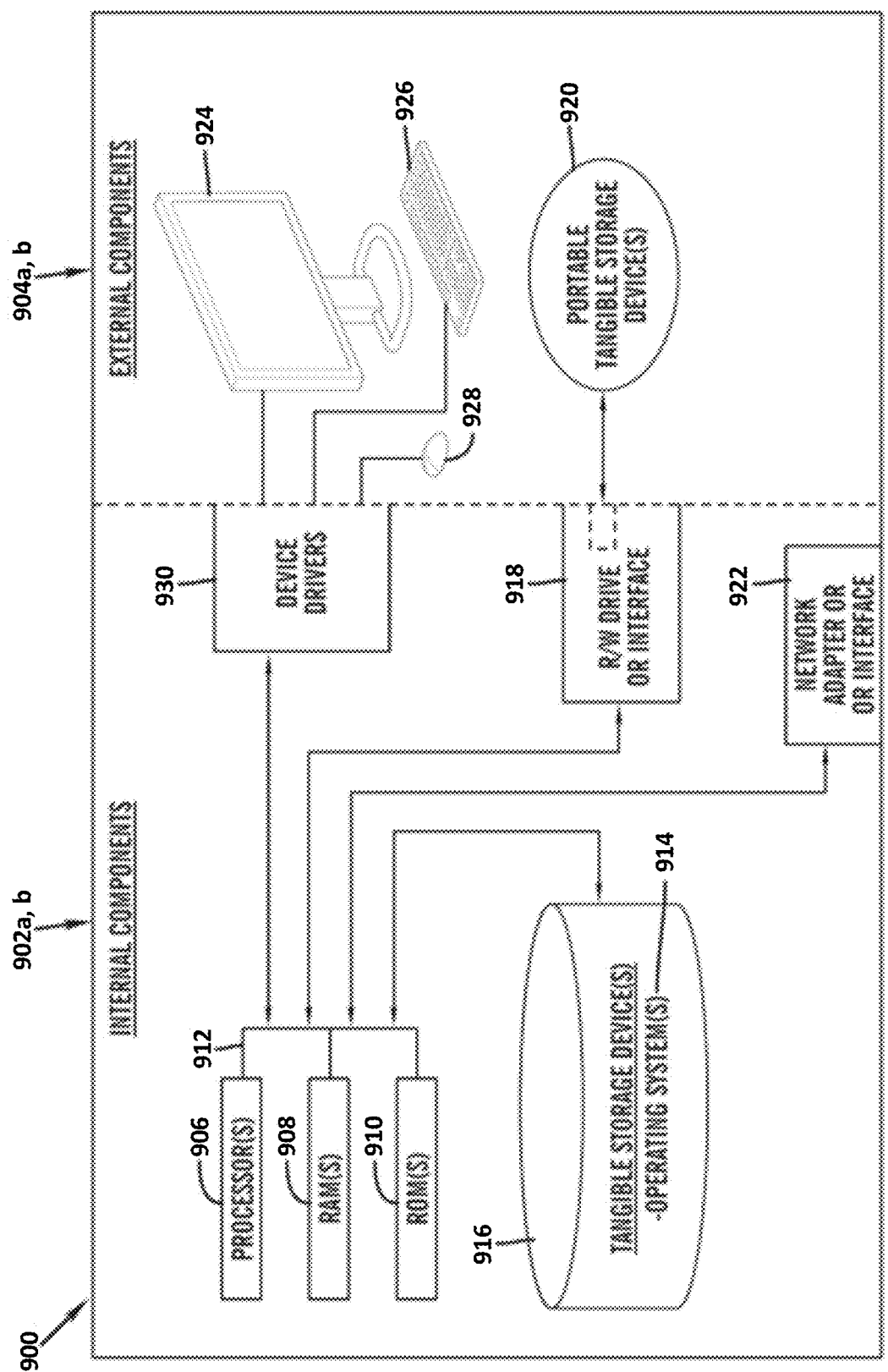
FIG. 5 is a block diagram of internal and external components of computers and servers depicted in FIG. 1 according to at least one embodiment.

FIG. 5 is a block diagram 900 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 5. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the cognitive SON program 110a in client computer 102, and the cognitive SON program 110b in network server 112, may be stored on one or more computer-readable tangible storage devices 916 for execution by one or more processors 906 via one or more RAMs 908 (which typically include cache memory). In the embodiment illustrated in FIG. 5, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the cognitive SON program 110a, 110b can be stored on one or more of the respective portable computer-readable tangible storage devices 920, read via the respective R/W drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the cognitive SON program 110a in client computer 102 and the cognitive SON program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the cognitive SON program 110a in client computer 102 and the cognitive SON program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 *a, b* also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Analytics as a Service (AaaS): the capability provided to the consumer is to use web-based or cloud-based networks (i.e., infrastructure) to access an analytics platform. Analytics platforms may include access to analytics software resources or may include access to relevant databases, corpora, servers, operating systems or storage. The consumer does not manage or control the underlying web-based or cloud-based infrastructure including databases, corpora, servers, operating systems or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
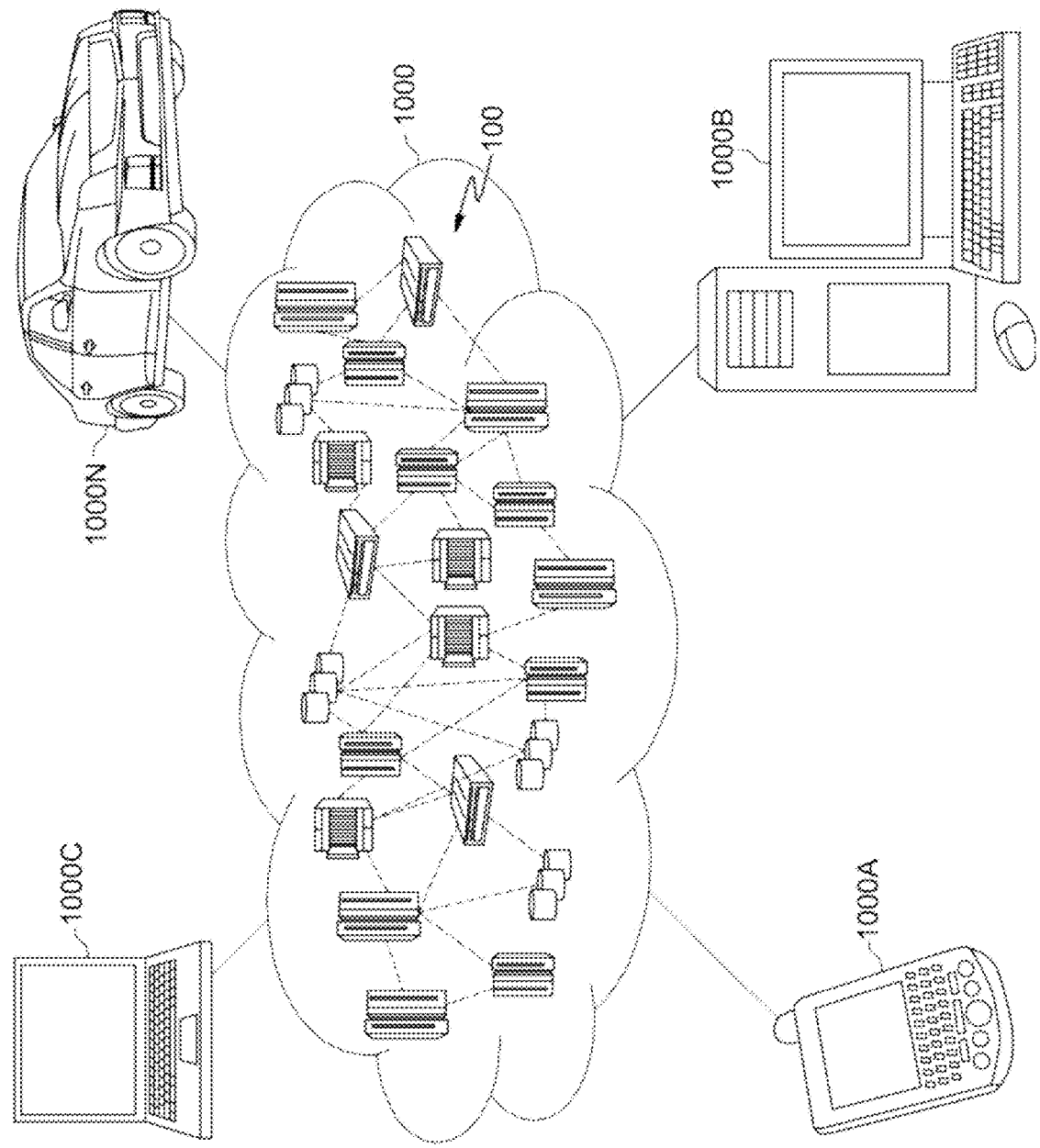
FIG. 6 is a block diagram of an illustrative cloud computing environment including the computer system depicted in FIG. 1, in accordance with an embodiment of the present disclosure.

Referring now to FIG. 6, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 6 are intended to be illustrative only and that computing nodes 100 and cloud computing environment 1000 can communicate with any type of computerized device over any type of network and/or network addressable connection (e.g., using a web browser).

Figure 7:
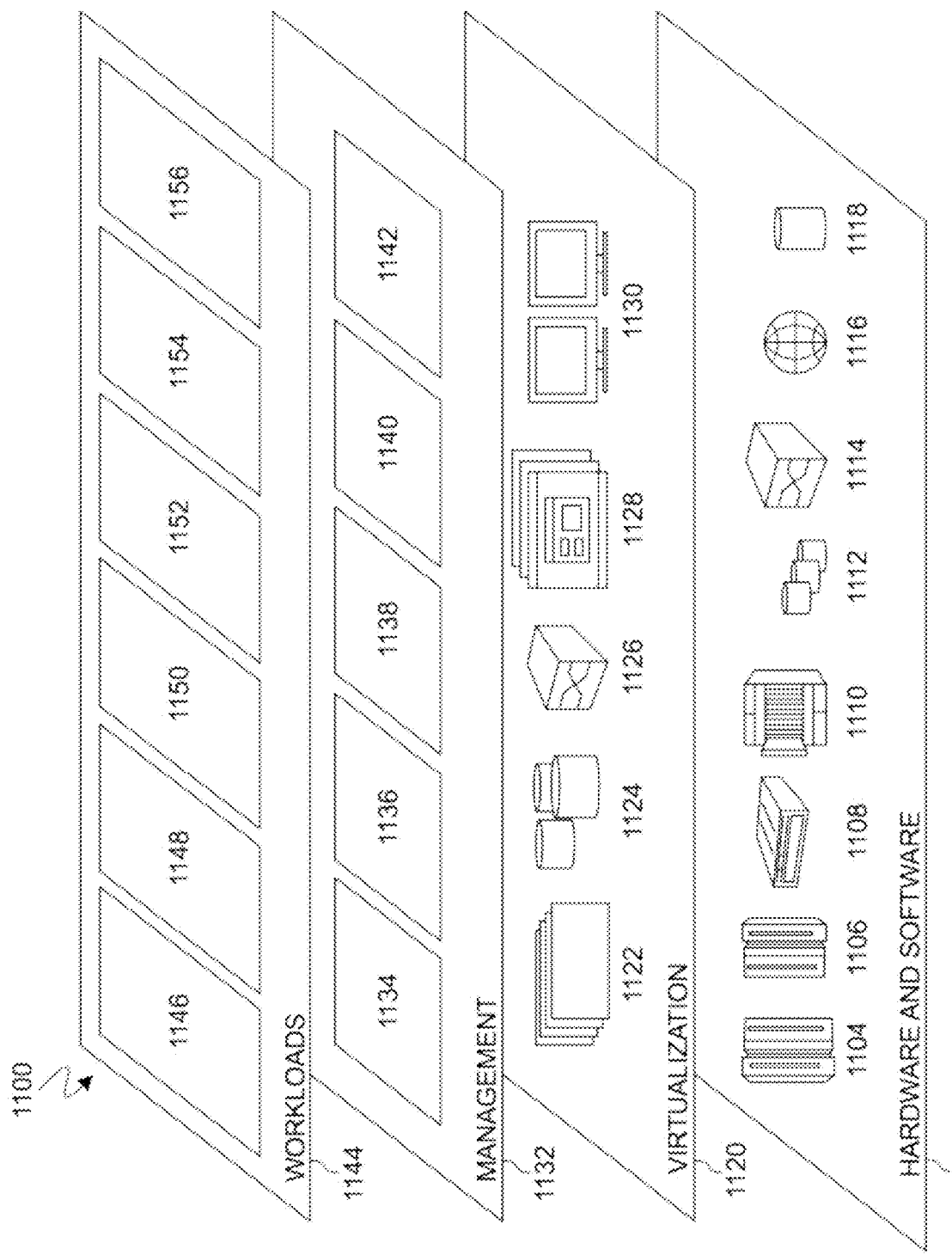
FIG. 7 is a block diagram of functional layers of the illustrative cloud computing environment of FIG. 6, in accordance with an embodiment of the present disclosure.

Referring now to FIG. 7, a set of functional abstraction layers 1100 provided by cloud computing environment 1000 is shown. It should be understood in advance that the components, layers, and functions shown in FIG. 7 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and cognitive SON 1156. A cognitive SON program 110a, 110b provides a way to optimizing user experience by utilizing at least one self-organizing network (SON).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for optimizing user experience by utilizing at least one self-organizing network (SON), the method comprising:
   generating one or more predictions associated with one or more optimizations for a plurality of unstructured data associated with one or more combined data sets;
   transferring the generated one or more predictions associated with the one or more optimizations to at least one SON controller; and
   implementing the one or more optimizations to an antennae signal to determine a relationship with the one or more optimizations and the plurality of unstructured data.

2. The method of claim 1, further comprising:
   collecting the plurality of unstructured data,
      wherein the collected plurality of unstructured data includes a plurality of mobile data associated with a mobile device utilized by a user and a plurality of social media data,
      wherein a data parser is utilized to collect the plurality of social media data,
      wherein the collected plurality of social media data is transmitted to a data mining model;
   normalizing the collected plurality of unstructured data associated into the one or more combined data sets; and
   correlating the normalized plurality of unstructured data associated with the one or more combined data sets.

3. The method of claim 2, wherein the collected plurality of mobile data is selected from the group consisting of:
   (i) at least one mobile position associated with the antennae;
   (ii) at least one download (DL) rate associated with the user;
   (iii) at least one upload (UL) rate associated with the user;
   (iv) at least one number of connections;
   (v) at least one quality of service (QoS) profile; and
   (vi) at least one user international mobile equipment identity (User IMEI(id)).

4. The method of claim 2, wherein normalizing the plurality of unstructured data associated into the one or more combined data sets, further comprises:
   associating the collected plurality of mobile data into a first data set and the collected plurality of social media data into a second data set;
   fusing the first data set associated with the plurality of mobile data with the second data set associated with the plurality of social media data to create the one or more combined data sets; and
   structuring the collected plurality of unstructured data associated with the fused first data set and the corresponding fused second data set,
      wherein one or more missing data values in the one or more combined data sets are cleaned,
      wherein the collected plurality of unstructured data associated with the one or more combined data sets are formatted into binary data values,
      wherein binning is executed for one or more non-existing data values,
      wherein the data values for each of the one or more non-existing data values is estimated.

5. The method of claim 2, wherein correlating the normalized plurality of unstructured data associated with the one or more combined data sets, further comprises:

determining a relationship between the normalized plurality of unstructured data by utilizing one or more linear graphs,
  wherein data values associated with each of the normalized plurality of unstructured data is plotted onto the one or more linear graphs.

6. The method of claim 4, wherein correlating the normalized plurality of unstructured data associated with the one or more combined data sets, further comprises:
  determining a relationship between the normalized plurality of unstructured data by utilizing one or more correlation statistical methods.

7. The method of claim 1, wherein generating the one or more predictions associated with the one or more optimizations for the plurality of unstructured data associated with the one or more combined data sets, further comprises:
  extracting a plurality of multiple variables associated with the plurality of unstructured data associated with the one or more combined data sets;
  transmitting the extracted plurality of multiple variables into a predictive machine learning (ML) model,
  analyzing the transmitted plurality of multiple variables with a plurality of historical data associated with a plurality of previous data sets by utilizing a recurrent neural network (RNN) model;
  identifying one or more key performance indicators (KPIs) and one or more decision lists associated with the one or more optimizations,
    wherein an suggested optimal value for the antennae signal is determined based on the plurality of unstructured data,
    wherein the one or more optimizations triggers one or more changes in the at least one SON; and
  producing one or more predictions associated with one or more optimizations based on the identified one or more KPIs and one or more decision lists by executing a multiple linear regression.

8. The method of claim 1, wherein implementing the one or more optimizations to the antennae signal to determine the relationship with the implemented one or more optimizations and the plurality of unstructured data, further comprises:
  transmitting the plurality of unstructured data to a long-short term memory (LSTM) model; and
  analyzing the transmitted plurality of unstructured data by utilizing the one or more processing layers of the LSTM model,
    wherein one or more changes associated with the at least one SON from the implemented one or more optimizations to the antennae signal are analyzed.

9. The method of claim 8, further comprising:
  in determining that the one or more optimizations associated with the plurality of unstructured data is true, adding the implemented one or more optimizations to a database.

10. The method of claim 8, further comprising:
  in determining that the one or more optimizations associated with the plurality of unstructured data is false, discarding the implemented one or more optimizations.

11. A computer system for optimizing user experience by utilizing at least one self-organizing network (SON), comprising:
  one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
    generating one or more predictions associated with one or more optimizations for a plurality of unstructured data associated with one or more combined data sets;
    transferring the generated one or more predictions associated with the one or more optimizations to at least one SON controller; and
    implementing the one or more optimizations to an antennae signal to determine a relationship with the one or more optimizations and the plurality of unstructured data.

12. The computer system of claim 11, further comprising:
  collecting the plurality of unstructured data,
    wherein the collected plurality of unstructured data includes a plurality of mobile data associated with a mobile device utilized by a user and a plurality of social media data,
    wherein a data parser is utilized to collect the plurality of social media data,
    wherein the collected plurality of social media data is transmitted to a data mining model;
  normalizing the collected plurality of unstructured data associated into the one or more combined data sets; and
  correlating the normalized plurality of unstructured data associated with the one or more combined data sets.

13. The computer system of claim 12, wherein the collected plurality of mobile data is selected from the group consisting of:
  (i) at least one mobile position associated with the antennae;
  (ii) at least one download (DL) rate associated with the user;
  (iii) at least one upload (UL) rate associated with the user;
  (iv) at least one number of connections;
  (v) at least one quality of service (QoS) profile; and
  (vi) at least one user international mobile equipment identity (User IMEI(id)).

14. The computer system of claim 12, wherein normalizing the plurality of unstructured data associated into the one or more combined data sets, further comprises:
  associating the collected plurality of mobile data into a first data set and the collected plurality of social media data into a second data set;
  fusing the first data set associated with the plurality of mobile data with the second data set associated with the plurality of social media data to create the one or more combined data sets; and
  structuring the collected plurality of unstructured data associated with the fused first data set and the corresponding fused second data set,
    wherein one or more missing data values in the one or more combined data sets are cleaned,
    wherein the collected plurality of unstructured data associated with the one or more combined data sets are formatted into binary data values,
    wherein binning is executed for one or more non-existing data values,
    wherein the data values for each of the one or more non-existing data values is estimated.

15. The computer system of claim 12, wherein correlating the normalized plurality of unstructured data associated with the one or more combined data sets, further comprises:
  determining a relationship between the normalized plurality of unstructured data by utilizing one or more linear graphs, wherein data values associated with each of the normalized plurality of unstructured data is plotted onto the one or more linear graphs.

16. A computer program product for optimizing user experience by utilizing at least one self-organizing network (SON), comprising:
one or more computer-readable storage media and program instructions stored on at least one of the one or more tangible storage media, the program instructions executable by a processor to cause the processor to perform a method comprising:
generating one or more predictions associated with one or more optimizations for a plurality of unstructured data associated with one or more combined data sets;
transferring the generated one or more predictions associated with the one or more optimizations to at least one SON controller; and
implementing the one or more optimizations to an antennae signal to determine a relationship with the one or more optimizations and the plurality of unstructured data.

17. The computer program product of claim 16, further comprising:
collecting the plurality of unstructured data,
wherein the collected plurality of unstructured data includes a plurality of mobile data associated with a mobile device utilized by a user and a plurality of social media data,
wherein a data parser is utilized to collect the plurality of social media data,
wherein the collected plurality of social media data is transmitted to a data mining model;
normalizing the collected plurality of unstructured data associated into the one or more combined data sets; and
correlating the normalized plurality of unstructured data associated with the one or more combined data sets.

18. The computer program product of claim 17, wherein the collected plurality of mobile data is selected from the group consisting of:
(i) at least one mobile position associated with the antennae;
(ii) at least one download (DL) rate associated with the user;
(iii) at least one upload (UL) rate associated with the user;
(iv) at least one number of connections;
(v) at least one quality of service (QoS) profile; and
(vi) at least one user international mobile equipment identity (User IMEI(id)).

19. The computer program product of claim 17, wherein normalizing the plurality of unstructured data associated into the one or more combined data sets, further comprises:
associating the collected plurality of mobile data into a first data set and the collected plurality of social media data into a second data set;
fusing the first data set associated with the plurality of mobile data with the second data set associated with the plurality of social media data to create the one or more combined data sets; and
structuring the collected plurality of unstructured data associated with the fused first data set and the corresponding fused second data set,
wherein one or more missing data values in the one or more combined data sets are cleaned,
wherein the collected plurality of unstructured data associated with the one or more combined data sets are formatted into binary data values,
wherein binning is executed for one or more non-existing data values,
wherein the data values for each of the one or more non-existing data values is estimated.

20. The computer program product of claim 17, wherein correlating the normalized plurality of unstructured data associated with the one or more combined data sets, further comprises:
determining a relationship between the normalized plurality of unstructured data by utilizing one or more linear graphs,
wherein data values associated with each of the normalized plurality of unstructured data is plotted onto the one or more linear graphs.

* * * * *